(12) United States Patent
Kim et al.

(10) Patent No.: US 9,594,463 B2
(45) Date of Patent: Mar. 14, 2017

(54) CAPACITIVE-TYPE TOUCH SCREEN PANEL

(71) Applicant: Samsung Display Co., Ltd, Yongin (KR)

(72) Inventors: Jung-Yun Kim, Cheonan-si (KR); Sung Ku Kang, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 7 days.

(21) Appl. No.: 14/337,705

(22) Filed: Jul. 22, 2014

(65) Prior Publication Data

US 2015/0253898 A1    Sep. 10, 2015

(30) Foreign Application Priority Data

Mar. 5, 2014 (KR) .................. 10-2014-0026156

(51) Int. Cl.
*G09G 3/36* (2006.01)
*G06F 3/044* (2006.01)

(52) U.S. Cl.
CPC .... *G06F 3/044* (2013.01); *G06F 2203/04111* (2013.01)

(58) Field of Classification Search
CPC ......... G06F 3/03547; G06F 2203/0339; G06F 2203/04103–2203/04107; G06F 2203/04111–2203/04113; G06F 1/169
See application file for complete search history.

(56) References Cited

U.S. PATENT DOCUMENTS

| 8,441,583 | B2 | 5/2013 | Lee et al. | |
| 2010/0253646 | A1* | 10/2010 | Hiratsuka | G06F 3/044 |
| | | | | 345/174 |
| 2011/0001717 | A1 | 1/2011 | Hayes et al. | |
| 2011/0050625 | A1* | 3/2011 | Kim | G06F 3/044 |
| | | | | 345/174 |
| 2013/0257786 | A1* | 10/2013 | Brown | G06F 3/044 |
| | | | | 345/174 |

FOREIGN PATENT DOCUMENTS

| JP | 2013-105429 | 5/2013 |
| KR | 10-2012-0035744 | 4/2012 |
| KR | 10-2012-0056033 | 6/2012 |
| KR | 10-2012-0083692 | 7/2012 |
| KR | 10-1285428 | 7/2013 |
| KR | 10-2013-0091518 | 8/2013 |

* cited by examiner

*Primary Examiner* — Sanghyuk Park
(74) *Attorney, Agent, or Firm* — H.C. Park & Associates, PLC

(57) ABSTRACT

A touch screen panel includes: an active region including a first active region and a second active region; first sense patterns including first sense pads arranged in the active region and first connection patterns connecting the first sense pads in a first direction; second sense patterns including second sense pads arranged in the active region and second connection patterns connecting the second sense pads in a second direction that crosses the first direction; and driving patterns arranged between the sense pads and the second sense pads, and connected to the first sense patterns arranged in the second active region.

20 Claims, 13 Drawing Sheets

CAPACITIVE-TYPE TOUCH SCREEN PANEL

CROSS-REFERENCE TO RELATED APPLICATION

This application claims priority from and benefit under 35 U.S.C. §119(a) of Korean Patent Application No. 10-2014-0026156, filed on Mar. 5, 2014, which is incorporated herein by reference for all purposes as if fully set forth herein.

BACKGROUND

Field

Exemplary embodiments of the present invention relate to a touch screen panel. More particularly, the exemplary embodiments of present invention relate to a capacitive-type touch panel screen.

Discussion of the Background

A touch panel is an input device that recognizes a touch location of a user and inputs a user's command. The touch panel is provided in a front surface of the display device to determine an input signal by recognizing a location where a hand of the user or an object touches. A touch panel may be classified as a resistive touch panel, a capacitive touch panel, an infrared touch panel, and an ultrasonic touch panel. In general, the resistive touch panel and the capacitive touch panel are used.

In particular, the capacitive touch panel may include a structure in which thin micro-electrode patterns are formed. The capacitive touch panel detects a touch location by sensing a variation of capacitance between electrodes when there is touch input by, for example, a user's finger.

The capacitive touch screen panel includes an active region where a plurality of sense patterns are arranged to sense variation of capacitance and an inactive region provided at an outer edge of the active region. A plurality of sense wires connected to the plurality of sense patterns are arranged in the inactive region. The inactive region may be equivalent to a region for a light blocking member disposed at an edge of a display panel.

Recently, display devices have increased in size, and accordingly, the touch screen panels have also increased in size. The size increase of the touch screen panel causes an increase in the number of sense patterns, and accordingly the number of sense wires connected to the sense patterns is also increased. When the number of sense wires is increased, the size of the inactive region of the touch screen panel is increased and thus the inactive region of the touch screen panel may be larger than the region for the light blocking member of the display panel.

The above information disclosed in this Background section is only for enhancement of understanding of the background of the invention and therefore it may contain information that does not form the prior art that is already known in this country to a person of ordinary skill in the art.

SUMMARY

Exemplary embodiments of the present invention provide a touch screen panel to solve problems related to the size increase of an inactive region, in a large-scaled touch screen panel.

A touch screen panel according to an exemplary embodiment of the present invention includes: an active region including a first active region and a second active region; first sense patterns including first sense pads arranged in the active region and first connection patterns connecting the first sense pads in a first direction; second sense patterns including second sense pads arranged in the active region and second connection patterns connecting the second sense pads in a second direction that crosses the first direction; and driving patterns arranged between the sense pads and the second sense pads, and connected to first sense patterns arranged in the second active region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION

Figure 1:
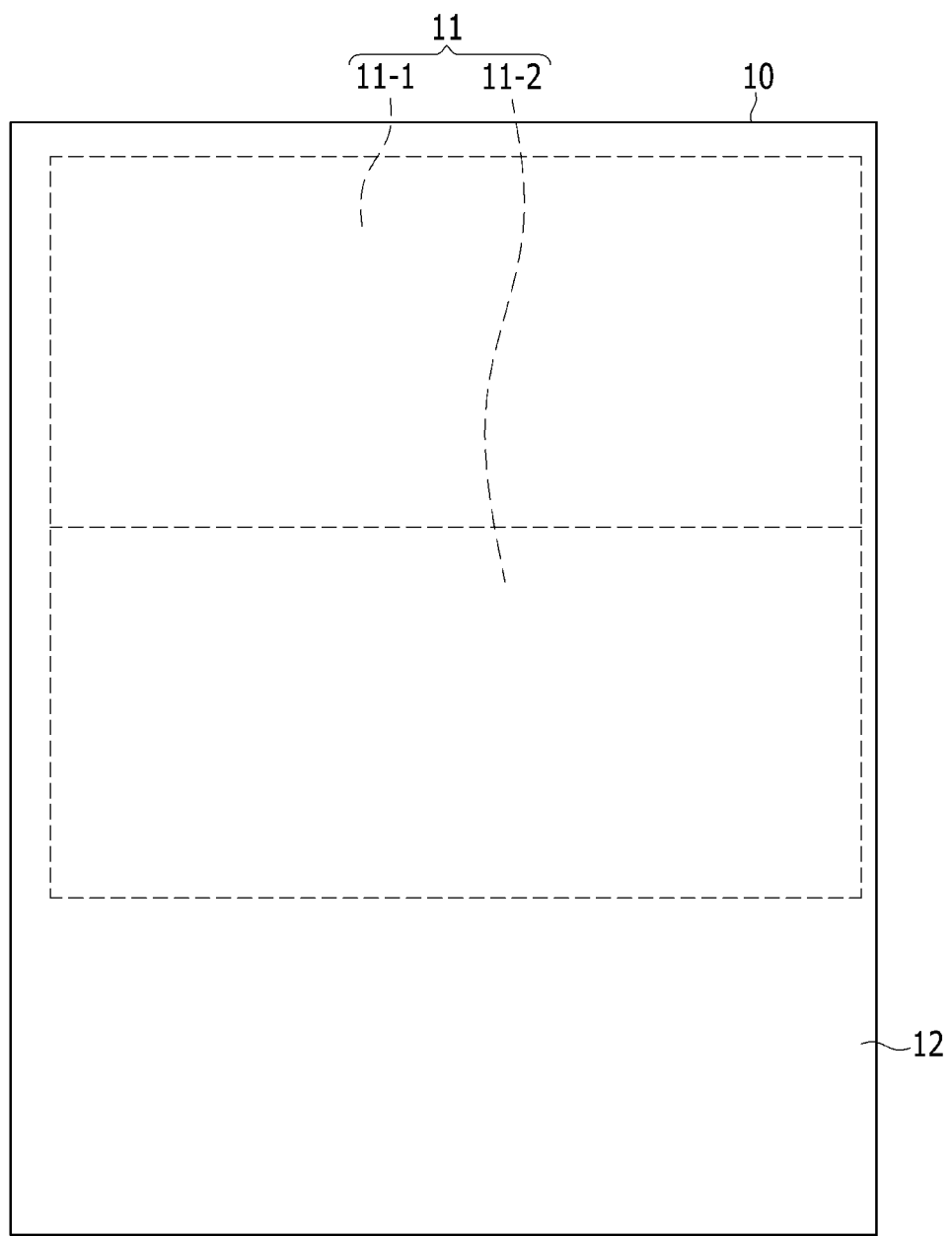
FIG. 1 is a top plan view of a touch screen panel according to an exemplary embodiment of the present invention.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. It will be understood that for the purposes of this disclosure, "at least one of X, Y, and Z" can be construed as X only, Y only, Z only, or any combination of two or more items X, Y, and Z (e.g., XYZ, XYY, YZ, ZZ). Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Hereinafter, a touch screen panel according to an exemplary embodiment of the present invention will be described with reference to FIG. 1 to FIG. 4.

Figure 2:
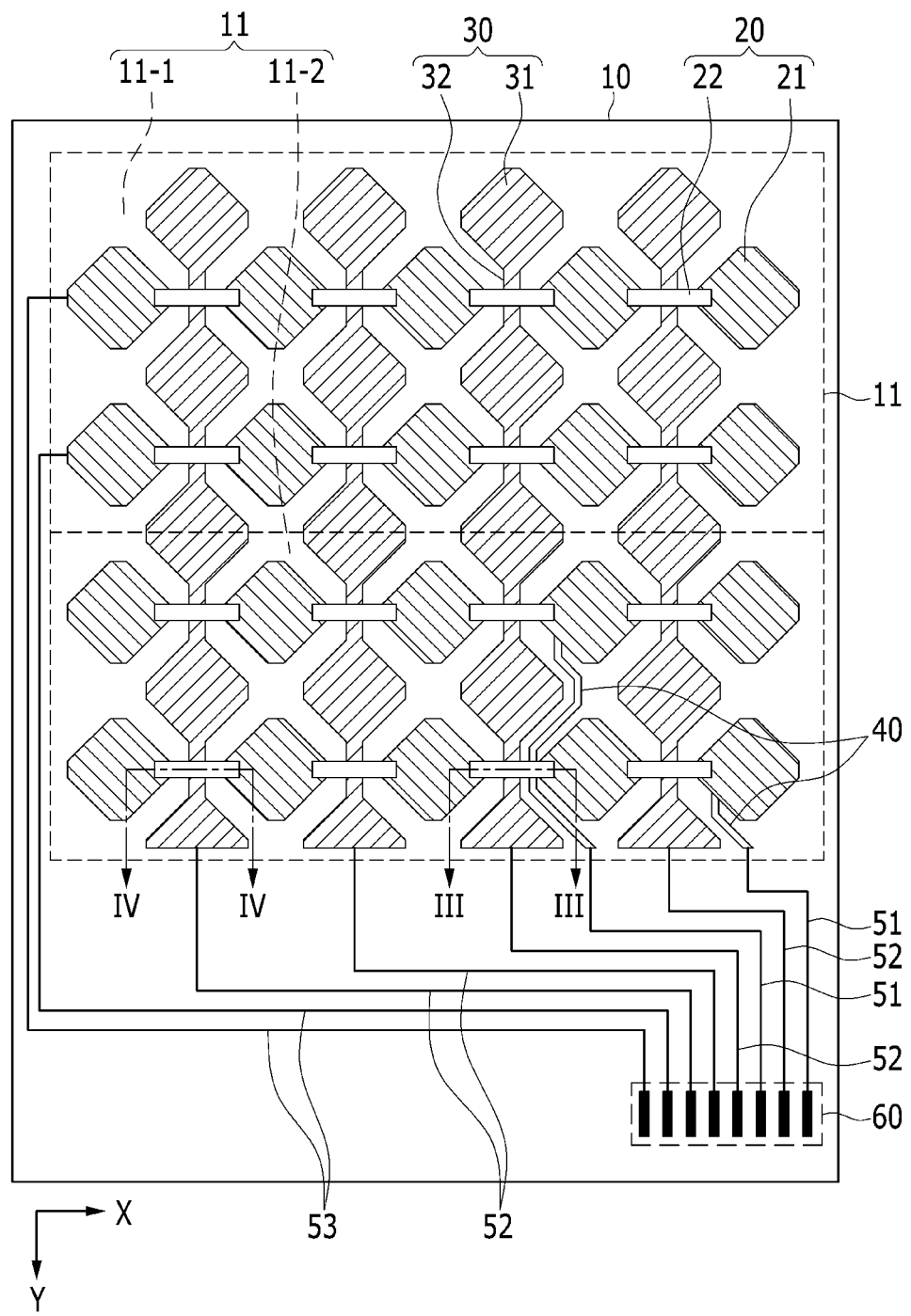
FIG. 2 is a top plan view of the touch screen panel of FIG. 1.
Figure 3:
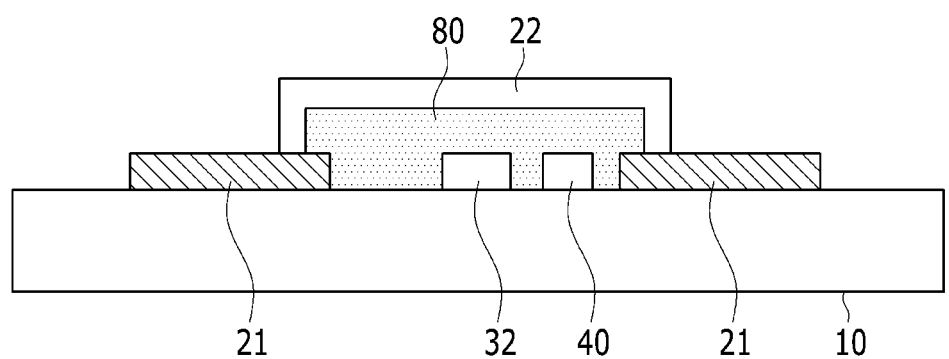
FIG. 3 is a cross-sectional view of the touch screen panel of FIG. 2, taken along the line III-III.
Figure 4:
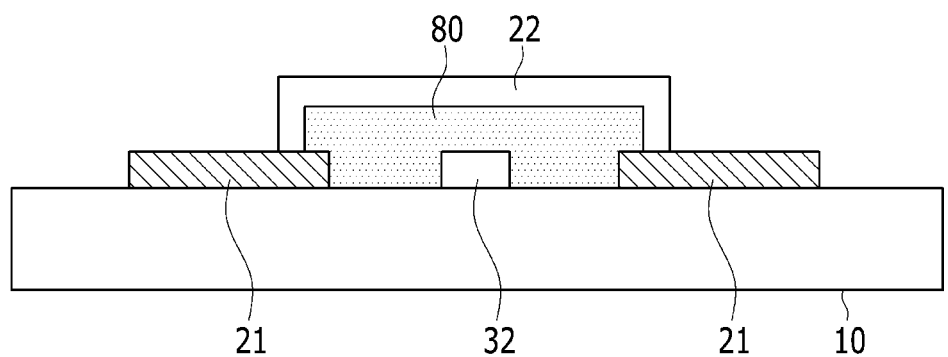
FIG. 4 is a cross-sectional view of the touch screen panel of FIG. 2, taken along the line IV-IV.

FIG. 1 is a top plan view of a substrate of a touch screen panel according to an exemplary embodiment of the present invention. FIG. 2 is a top plan view of the touch screen panel of FIG. 1. FIG. 3 is a cross-sectional view of the touch screen panel, taken along the line III-III of FIG. 2. FIG. 4 is a cross-sectional view of the touch screen panel taken along the line IV-IV of FIG. 2.

As illustrated in FIG. 1, the touch screen panel includes a transparent substrate 10, which includes an active region 11 and an inactive region 12. The active region 11 includes a first active region 11-1 and a second active region 11-2.

The transparent substrate 10 may be made of a transparent glass material made of $SiO_2$, or a transparent plastic material. The plastic material that forms the transparent substrate 10 may be selected from polyethersulfone (PES), polyacrylate (PAR), polyetherimide (PEI), polyethylene naphthalate (PEN), polyethylene terephthalate (PET), polyphenylene sulfide (PPS), polyallylate, polycarbonate (PC), triacetyl cellulose (TAC), and cellulose acetate propionate (CAP).

Referring to FIG. 2, the touch screen panel also includes first sense patterns 20, second sense patterns 30, driving patterns 40, first sense wires 51, second sense wires 52, third sense wires 53, and a pad portion 60.

The active region 11 is a region where the first sense patterns 20, the second sense patterns 30, and the driving patterns 40 are disposed. The inactive region 12 is an outer edge region of the active region 11, and the first sense wires 51, the second sense wires 52, the third sense wires 53, and the pad portion 60 may be disposed in the inactive region 12.

The first active region 11-1 is a region that is further from the pad portion 60 than, the second active region 11-2. The first sense patterns 20, the second sense patterns 30, and the driving patterns 40 may be disposed in the second active region 11-2. The first sense patterns 20 and the second sense patterns 30 are also disposed in the first active region 11-1. The first active region 11-1 may be defined as a region in the active region 11 where the driving patterns 40 are not disposed. The second active region 11-2 may occupy more than half the area of the active region 11. In other words, the second active region 11-2 may be larger than the first active region 11-1.

The first sense patterns 20 are extended in a first direction and arranged along a second direction that crosses the first direction. The first direction may be an X-axis direction and the second direction may be a Y-axis direction, and the first direction and the second direction may be perpendicular to each other. The first sense patterns 20 include first sense pads 21 arranged with a gap between the first sense pads, and first connection patterns 22 connecting the first sense pads 21 in the first direction.

The plurality of second sense patterns 30 are extended in the second direction and arranged along the first direction. The second sense patterns 30 include second sense pads 31 arranged with a gap between each other, and second connection patterns 32 connecting the second sense pads 31 in the second direction. The second sense pads 31 are arranged to not overlap with the first sense pads 21.

The first sense pads 21 and the second sense pads 31 may be formed in various shapes, such as a triangle, a hexagon, a polygon, and the like. For example, as illustrated in FIG. 1 and FIG. 2, the first sense pads 21 and the second sense pads 31 may be formed in a quadrangle shape.

The driving patterns 40 are extended in the second direction and arranged between the first sense pads 21 and the second sense pads 31. The driving patterns 40 are respectively connected to first sense pads 21 arranged in different rows in the X-axis direction arranged in the second active region 11-2. Alternatively, the driving patterns 40 may be respectively connected to first connection patterns 22 arranged in different rows in the X-axis direction arranged in the second active region 11-2. The driving patterns 40 respectively have different lengths.

The first sense patterns 20, the second sense patterns 30, and the driving patterns 40 may be made of a transparent conductive material such as indium tin oxide (ITO), indium zinc oxide (IZO), carbon nanotubes (CNT), graphene, a metal mesh, a polymer conductor (e.g., PEDOT:PSS), and the like. The first connection patterns 22 and the second connection patterns 32 may be made of a metal material such as copper (Cu), aluminum (Al), molybdenum (Mo), silver (Ag), titanium (Ti), and the like.

The first connection patterns 22 arranged in the first active region 11-1 respectively cross the second connection patterns 32. Some of the first connection patterns 22 arranged in the second active region 11-2 cross the second connection patterns 32 and the driving patterns 40. While some of the first connection patterns 22 cross only the second connection patterns 32. When crossing each other, the first connection patterns 22, the second connection patterns 32, and the driving patterns 40 are electrically insulated from each other.

FIG. 3 is a cross-sectional view of the touch screen panel of FIG. 2, taken along the line III-III. As illustrated in FIG. 3, the first sense pads 21, the second connection pattern 32, and the driving pattern 40 are disposed at a distance from each other in the same layer on the transparent substrate 10, and an insulating layer 80 is provided on the second connection pattern 32, and the driving pattern 40. The first connection patterns 22 are disposed on the insulating layer 80 to connect the first sense pads 21 that are separated from each other. The insulating layer 80 may be made of an inorganic insulating material such as a silicon nitride (SiN$_x$), a silicon oxide (SiO$_x$), and the like, or an organic insulating layer.

FIG. 4 is a cross-sectional view of the touch screen panel of FIG. 2, taken along the line IV-IV'. As illustrated in FIG. 4, the first sense pads 21 and the second connection pad 32 are disposed at a distance from each other in the same layer on the transparent substrate 10, and the insulating layer 80 is provided on the second connection pattern 32. The first connection pattern 22 is provided on the insulating layer 80 to connect the first sense pads 21 that are separated from each other.

The insulting layer 80 may be partially provided only in a portion where the first connection pattern 22 crosses the second connection pattern or the driving pattern 40. The insulating layer 80 may also be wholly disposed on the transparent substrate 10 where the first sense pads 21, the second connection patterns 32, and the driving patterns 40 are formed. In such a case, additional contact holes, not shown, are formed in the insulating layer 80, and the first connection patterns 22 may connect the first sense pads 21 that are separated from each other through the contact holes.

As illustrated in FIG. 2, the first sense wires 51 are provided in the inactive region 12 to connect the driving patterns 40 and the pad portion 60. The first sense patterns 20 provided in the second active region 11-2 may be electrically connected to the pad portion 60 through the driving patterns 40 and the first sense wires 51.

The second sense wires 52 are provided in the inactive region 12 to electrically connect the second sense patterns 30 and the pad portion 60.

The third sense wires 53 are provided in the inactive region 12 to electrically connect the first sense patterns 20 provided in the first active region 11-1 and the pad portion 60.

The first sense wires 51, the second sense wires 52, and the third sense wires 53 may be made of a metal material such as copper (Cu), aluminum (Al), molybdenum (Mo), silver (Ag), titanium (Ti), and the like.

As described above, the first sense patterns 20 provided in the first active region 11-1 that is relatively distanced from the pad portion 60 are connected with the pad portion 60 through the third sense wires 53 made of the metal material. The first sense patterns 20 provided in the second active region 11-2 that is relatively closer to the pad portion 60 are connected to the pad portion 60 through the driving patterns 40 extended in the second direction in the second active region 11-2 and the first sense wires 51. With such structure, the number of third sense wires 53 provided in the left and right sides of the active region 11 may be reduced, and the number of dead spaces for alignment of the third sense wires 53 can be reduced. In addition, since the first sense pads 21, the second connection patterns 32, and the driving patterns 40 are disposed in the same layer on the transparent substrate 10, the first sense pads 21, the second connection patterns 32, and the driving patterns 40 can be formed through one process, and an additional process or an additional mask for forming the driving patterns 40 may not be needed.

The first sense patterns 20 arranged in the first active region 11-1 may also be connected to the pad portion 60 through the driving patterns 40. However, when the driving patterns 40 are extended to the first active region 11-1 that is relatively distanced from the pad portion 60 in a large-sized touch screen panel, resistance due to the driving patterns 40 is increased by more than 50 times so that sensing capacity of the touch screen panel is deteriorated. On the other hand, as described above, when the third sense wires 53 made of a metal material are connected to the plurality of first sense patterns 20 provided in the first active region 11-1, the increase of resistance due to the driving patterns 40 can be suppressed.

Hereinafter, a touch screen panel according to an exemplary embodiment of the present invention will be described with reference to FIG. 5 to FIG. 7.

Figure 5:
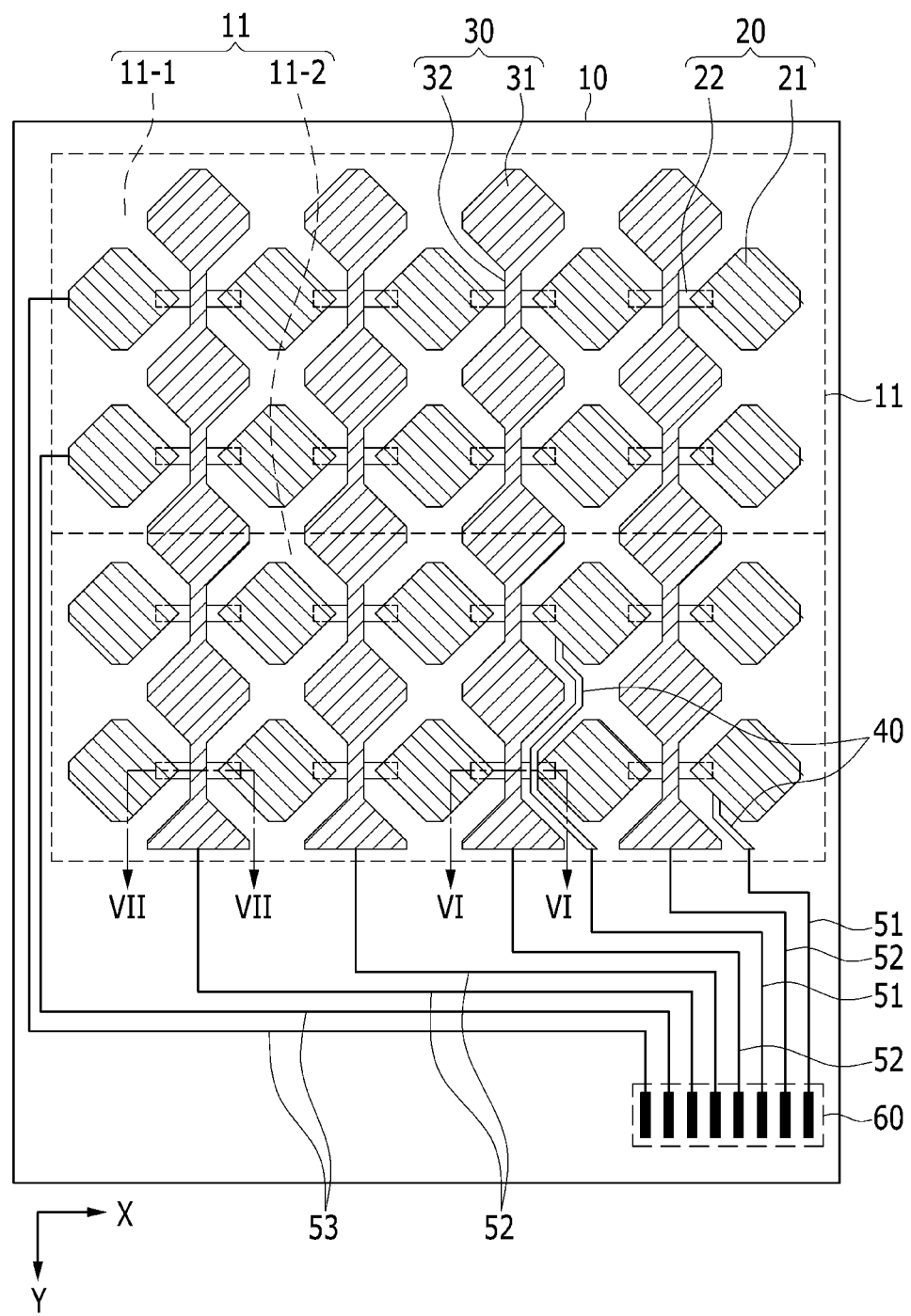
FIG. 5 is a top plan view of a touch screen panel according to an exemplary embodiment of the present invention.

FIG. 5 is a top plan view of a touch screen panel according to another exemplary embodiment of the present invention. FIG. 6 is a cross-sectional view of the touch screen panel of FIG. 5, taken along the line VI-VI. FIG. 7 is a cross-sectional view of the touch screen panel of FIG. 5, taken along the line VII-VII.

Unlike FIG. 1 to FIG. 4, the first connection patterns 22 connecting the first sense pads 21 are provided below an insulating layer 80.

Figure 6:
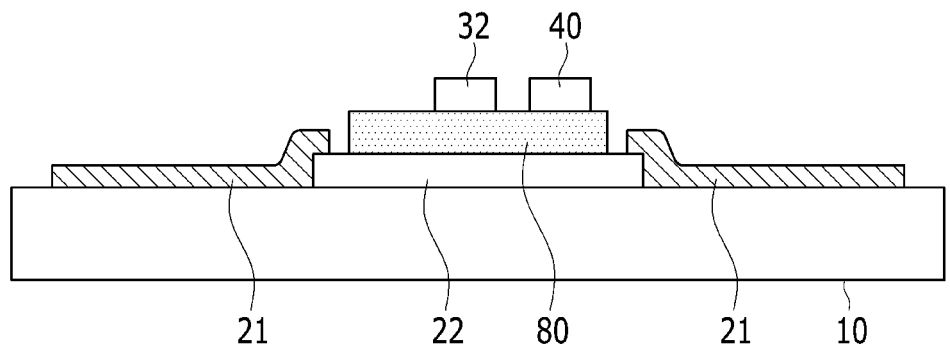
FIG. 6 is a cross-sectional view of the touch screen panel of FIG. 5, taken along the line VI-VI.

Referring to FIG. 6, the sense pads 21 and the first connection pattern 22 are provided on a transparent substrate 10, and the insulating layer 80 is provided on the first connection pattern 22. The second connection pattern 32 and driving patterns 40 are disposed at a distance from each other on the insulating layer 80.

Figure 7:
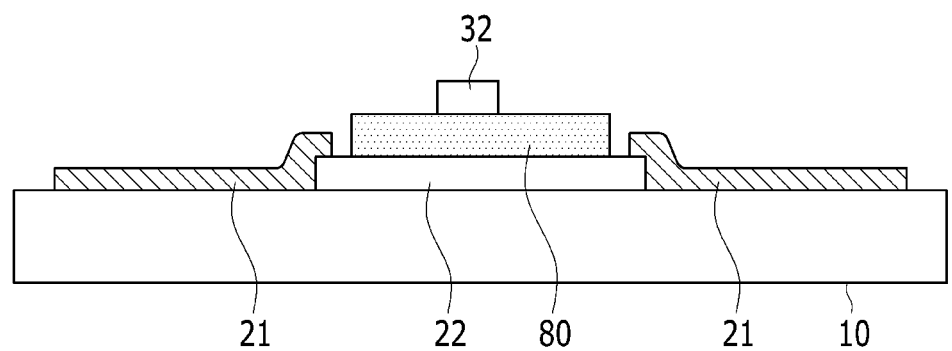
FIG. 7 is a cross-sectional view of the touch screen panel of FIG. 5, taken along the line VII-VII.

Referring to FIG. 7, the first sense pads 21 and the first connection pattern 22 are provided on the transparent substrate 10, and the insulating layer 80 is provided on the first connection pattern 22. The second connection pattern 32 is disposed on the insulating layer 80.

As illustrated in FIG. 6 and FIG. 7, the insulating layer 80 may be partially disposed on the first connection patterns 22, but the insulating layer 80 may be wholly disposed on the transparent substrate 10 where the first sense pads 21 and the first connection patterns 22 are formed. In such a case, an additional contact holes, not shown, may be formed in the insulating layer 80, and the second connection patterns 32 may connect the second sense pads 31 that are separated from each other through the contact holes.

Other structures are the same as shown in FIG. 1 to FIG. 4, and therefore no further detailed description will be provided.

Hereinafter, a touch screen panel according to an exemplary embodiment of the present invention will be described with reference to FIG. 8 to FIG. 10.

Figure 8:
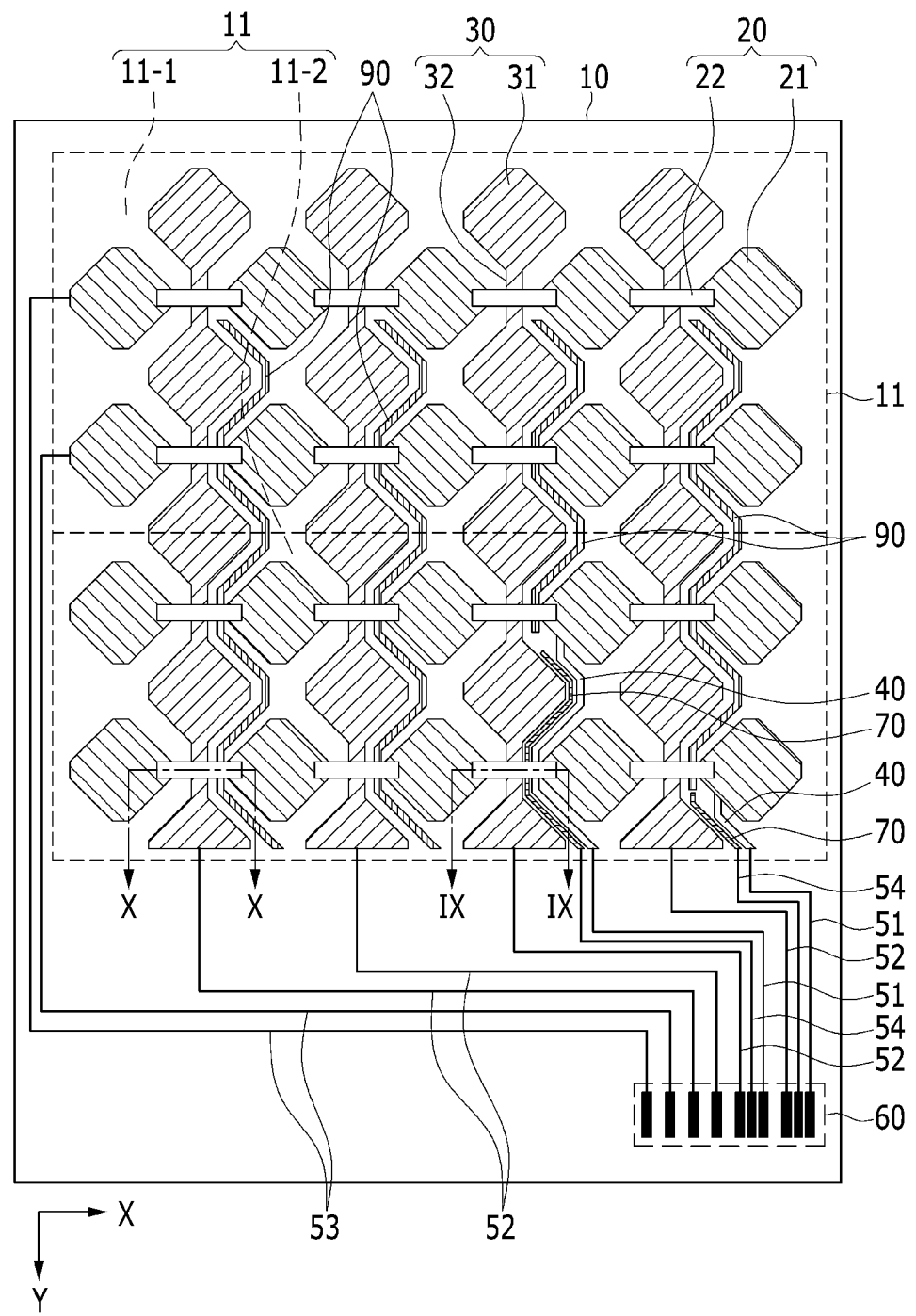
FIG. 8 is a top plan view of a touch screen panel according to an exemplary embodiment of the present invention.

FIG. 8 is a top plan view of a touch screen panel according to another exemplary embodiment of the present invention. FIG. 9 is a cross-sectional view of the touch screen panel of FIG. 8, taken along the line IX-IX. FIG. 10 is a cross-sectional view of the touch screen panel of FIG. 8, taken along the line X-X.

Compared to the touch screen panel of FIG. 1 to FIG. 4, the touch screen panel of the present exemplary embodiment further includes dummy patterns 90, ground patterns 70, and fourth sense wires 54.

The dummy patterns 90 are extended in a second direction in an active region 11, and arranged between the first sense pads 21 and the second sense pads 31. In this case, the dummy patterns 90 do not overlap with the driving patterns 40 by arranging the dummy patterns 90 in a portion where the driving patterns 40 are not disposed. The dummy patterns 90 may be made of the same material as the driving patterns 40 such as a transparent conductive material such as ITO, IZO, CNT, graphene, a metal mesh, a polymer conductor (e.g., PEDOT:PSS), and the like.

The driving patterns 40 are respectively connected to the first sense pads 21 arranged in different rows along the X-axis among the first sense pads 21 arranged in a second active region 11-2, and therefore the driving patterns 40 respectively have different lengths and a gap region where the driving patterns 40 do not exist is formed. The gap region where the driving patterns 40 do not exist may be viewed by a user, and accordingly visibility may be deteriorated. However, the dummy patterns 90 are provided in the gap region to prevent deterioration of visibility.

Ground patterns 70 are disposed in parallel with the driving patterns 40 between the first sense pads 21 and the second sense pads 31 in the second active region 11-2. The ground patterns 70 are extended in the second direction, and may be arranged between the driving patterns 40 and the second sense pads 31. The ground patterns 70 may be made of the same material as the driving patterns 40 such as a transparent conductive material such as ITO, IZO, CNT, graphene, a metal mesh, a polymer conductor (e.g., PEDOT:PSS), and the like.

The fourth sense wires 54 are provided in the inactive region 12 to electrically connect the ground patterns 70 and the pad portion 60. The fourth sense wires 54 may be made of a metal material such as copper (Cu), aluminum (Al), molybdenum (Mo), silver (Ag), titanium (Ti), and the like.

The ground patterns 70 may be connected to ground through the fourth sense wires 54 and the pad portion 60. Since the ground patterns 70 are connected to ground, a ground voltage is applied to the ground patterns 70.

When the driving voltage is applied to the first sense patterns 20 through the driving patterns 40, noise may be generated in second sense patterns 31 that are adjacent to the driving patterns 40 due to the driving voltage. When the ground patterns 70 are provided between the driving patterns 40 and the second sense patterns 31, generation of the noise due to the driving voltage of the driving patterns 40 may be prevented by the ground voltage of the ground patterns 70.

Figure 9:
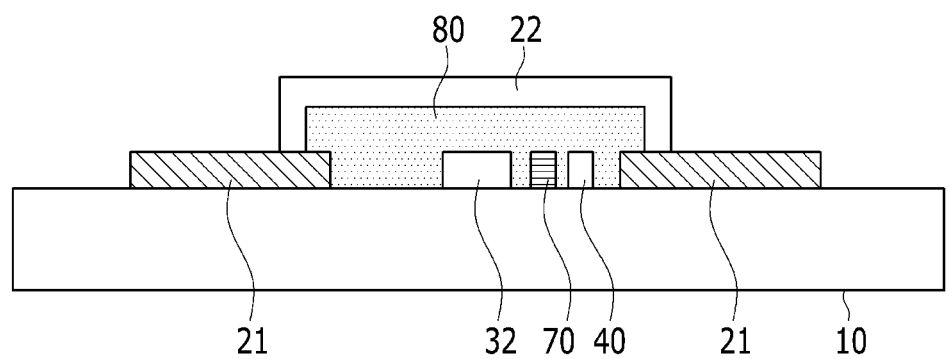
FIG. 9 is a cross-sectional view of the touch screen panel of FIG. 8, taken along the line IX-IX.

Referring to FIG. 9, the first sense pads 21, the second connection pattern 32, the driving pattern 40, and the ground pattern 70 are provided at a distance from each other in the same layer on the transparent substrate 10. An insulating layer 80 is provided on the second connection pattern 32, the driving pattern 40, and the ground pattern 70. The first connection pattern 22 is provided on the insulating layer 80 to connect the first sense pads 21 that are disposed at a distance from each other.

Figure 10:
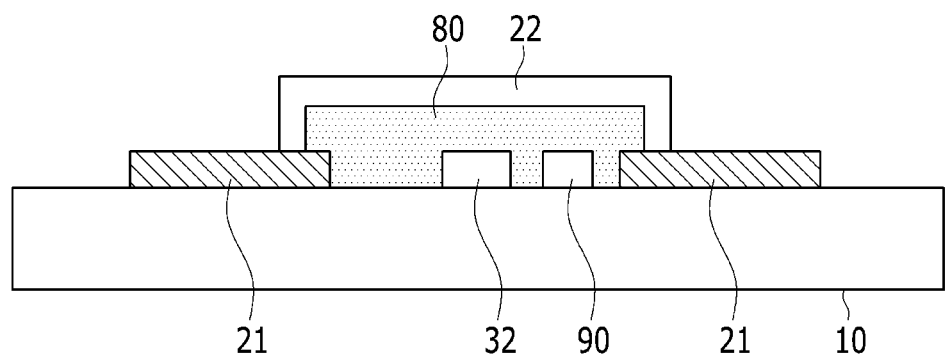
FIG. 10 is a cross-sectional view of the touch screen panel of FIG. 8, taken along the line X-X.

Referring to FIG. 10, the first sense pads 21, the second connection pattern 32, and the dummy pattern 90 are provided at a distance from each other in the same layer on the transparent substrate 10. The insulating layer 80 is provided on the second connection pattern 32 and the dummy pattern 90. The first connection pattern 22 is provided on the insulating layer 80 to connect the first sense pads 21 that are disposed at a distance from each other.

Since the first sense pads 21, the second connection patterns 32, the driving patterns 40, the ground patterns 70, and the dummy patterns 90 are formed in the same layer on the transparent substrate 10, the first sense pads 21, the second connection patterns 32, the driving patterns 40, the ground patterns 70, and the dummy patterns 90 can be formed through one process, and no additional process or no additional mask is required for forming the driving patterns 40.

Other structures are the same as shown in FIG. 1 to FIG. 4, and therefore no further detailed description will be provided.

Hereinafter, a touch screen panel according to another exemplary embodiment of the present invention will be described with reference to FIG. 11 to FIG. 13.

Figure 11:
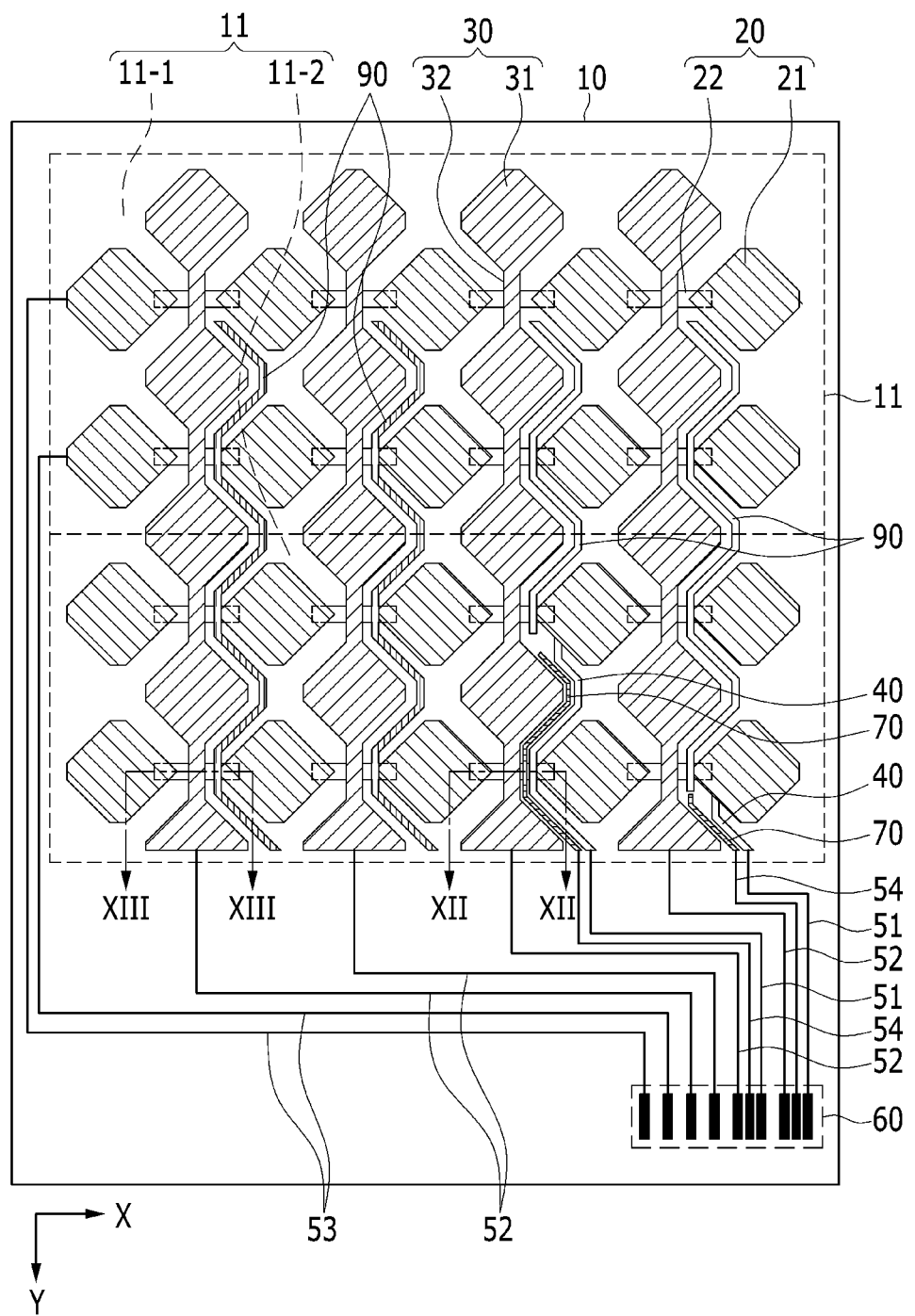
FIG. 11 is a top plan view of a touch screen panel according to an exemplary embodiment of the present invention.

FIG. 11 is a top plan view of a touch screen panel according to another exemplary embodiment of the present invention. FIG. 12 is a cross-sectional view of the touch screen panel of FIG. 11, taken along the line XII-XII. FIG. 13 is a cross-sectional view of the touch screen panel of FIG. 11, taken along the line XIII-XIII.

Unlike FIG. 8 to FIG. 10, the first connection patterns 22 that connect the first sense pads 21 are provided below an insulating layer 80.

Figure 12:
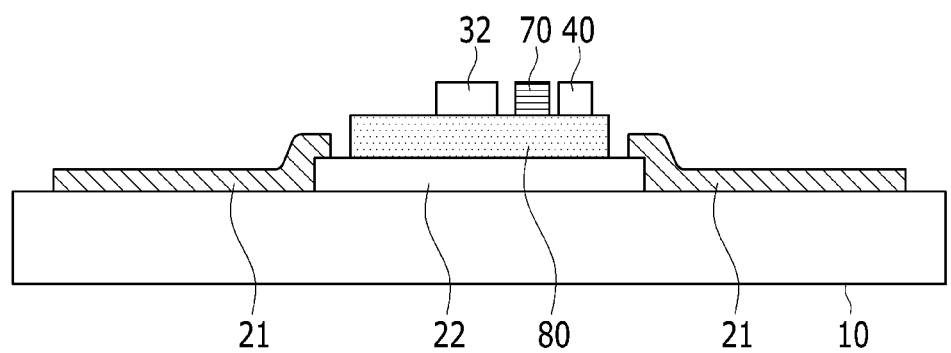
FIG. 12 is a cross-sectional view of the touch screen panel of FIG. 11, taken along the line XII-XII.

Referring to FIG. 12, the first sense pads 21 and the first connection pattern 22 is provided on a transparent substrate 10, and the insulating layer 80 is provided on the first connection pattern 22. The second connection pattern 32, a ground pattern 70, and a driving pattern 40 are disposed at a distance from each other on the insulating layer 80.

Figure 13:
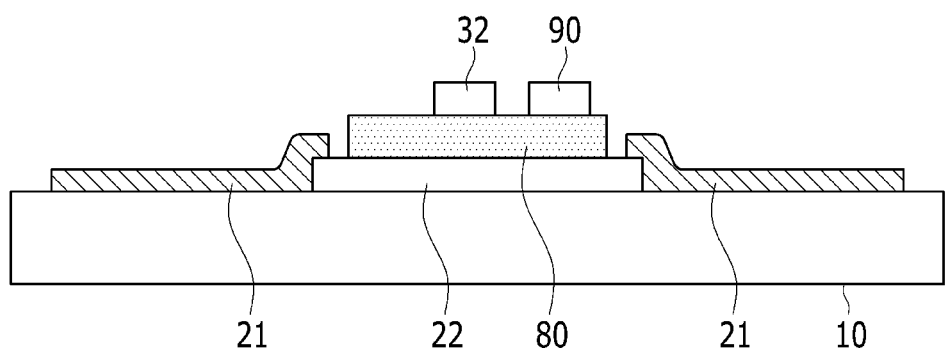
FIG. 13 is a cross-sectional view of the touch screen panel of FIG. 11, taken along the line XIII-XIII.

Referring to FIG. 13, the first sense pads 21 and the second connection pattern 22 are provided on the transparent substrate 10, and the insulating layer 80 is provided on the first connection pattern 22. The second connection pattern 32 and the dummy pattern 90 are provided on the insulating layer 80.

As illustrated in FIG. 12 and FIG. 13, the insulating layer 80 may be partially disposed on the first connection patterns 22, but the insulating layer 80 may be wholly disposed on the transparent substrate 10 where the first sense pads 21 and the first connection patterns 22 are formed. In such a case, additional contact holes, not shown, are formed in the insulating layer 80, and the second connection patterns 32 may connect the separated second sense pads 31 through the contact holes.

Other structures are the same as shown in FIG. 1 to FIG. 4 and FIG. 8 to FIG. 10, and therefore no further detailed description will be provided.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative, and it is intended that the present invention cover the modifications and variations of this invention provided they come within the scope of the appended claims and their equivalents.

What is claimed is:

1. A touch screen panel comprising:
a transparent substrate comprising an active region, the active region comprising a first active region and a second active region;
first sense patterns disposed in the first active region and the second active region, and comprising first sense pads disposed in rows and first connection patterns connecting the first sense pads;
second sense patterns disposed in the first active region and the second active region, and comprising second sense pads disposed in columns and second connection patterns connecting the second sense pads; and
driving patterns disposed only in the second active region and extending between the first sense pads and the second sense pads in the second active region, each driving pattern connected to a first sense pattern of a different row,
wherein all first sense pads disposed in the same row are connected to each other through corresponding first connection patterns.

2. The touch screen panel of claim 1, further comprising: first sense wires disposed in an inactive region of the substrate disposed outside of the active region, the first sense wires connected to the driving patterns.

3. The touch screen panel of claim 2, further comprising second sense wires disposed in the inactive region and connected to the second sense patterns.

4. The touch screen panel of claim 3, further comprising third sense wires disposed in the inactive region and connected to the first sense wires disposed in the first active region.

5. The touch screen panel of claim 4, further comprising a pad portion connected to the first sense wires, the second sense wires, and the third sense wires.

6. The touch screen panel of claim 5, wherein the first active region is located further away from the pad portion than the second active region.

7. The touch screen panel of claim 1, wherein the first sense pads, the second connection patterns, and the driving patterns are disposed in the same layer on the transparent substrate.

8. The touch screen panel of claim 7, further comprising an insulating layer disposed on the second connection patterns and the driving patterns,
wherein the first connection patterns extend across the second connection patterns and the driving patterns, and
wherein the insulating layer is disposed between the first connection patterns and the second connection patterns and the driving patterns.

9. The touch screen panel of claim 1, wherein the first sense pads and the first connection patterns are disposed in the same layer on the transparent substrate.

10. The touch screen panel of claim 9, further comprising an insulating layer disposed on the first connection patterns,
wherein the second connection patterns and the driving patterns extend across the first connection patterns, and
wherein the insulating layer is disposed between the second connection patterns and the driving patterns and the first connection patterns.

11. The touch screen panel of claim 1, further comprising dummy patterns disposed between the first sense pads and the second sense pads.

12. The touch screen panel of claim 11, wherein the dummy patterns and the driving patterns extend between different ones of the first sense patterns and the second sense patterns.

13. The touch screen panel of claim 12, wherein the dummy patterns and the driving patterns comprise the same material.

14. The touch screen panel of claim 12, further comprising ground patterns disposed in parallel with the driving patterns.

15. The touch screen panel of claim 14, wherein the ground patterns are disposed between the driving patterns and the second sense pads.

16. The touch screen panel of claim 14, further comprising fourth sense wires disposed in an inactive region of the substrate disposed outside of the active region, the fourth sense wires connected to the ground patterns.

17. The touch screen panel of claim 14, further comprising a transparent substrate comprising the active region,
wherein the first sense pads, the second connection patterns, the driving patterns, the dummy patterns, and the ground patterns are disposed in the same layer on the transparent substrate.

18. The touch screen panel of claim 17, further comprising an insulating layer disposed on the second connection patterns, the driving patterns, the dummy patterns, and the ground patterns,
wherein the first connection patterns extend across the second connection patterns, the driving patterns, the dummy patterns, and the ground patterns, and
wherein the insulating layer is disposed between the first connection patterns and the second connection patterns, the driving patterns, the dummy patterns, and the ground patterns.

19. The touch screen panel of claim 14, further comprising a transparent substrate comprising the active region,
wherein the first sense pads and the first connection patterns are disposed in the same layer on the transparent substrate.

20. The touch screen panel of claim 19, further comprising an insulating layer disposed on the first connection patterns,
wherein the second connection patterns, the driving patterns, the dummy patterns, and the ground patterns extend across the first connection patterns, and
wherein the insulating layer is disposed between the second connection patterns, the driving patterns, the dummy patterns, and the ground patterns, and the first connection patterns.

* * * * *